Dec. 29, 1931.　　W. N. STEVENS　　1,838,714
CHUCK
Filed Jan. 4, 1927　　2 Sheets-Sheet 1
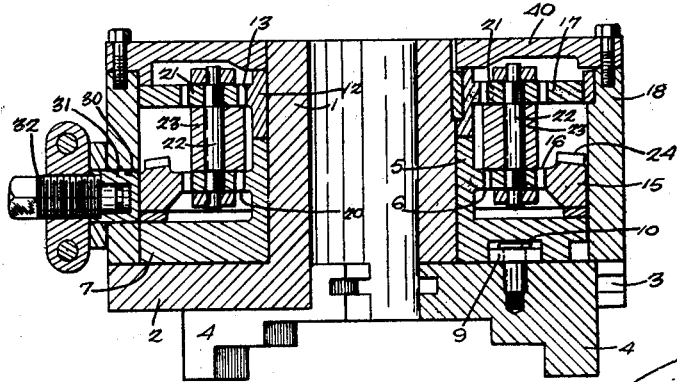
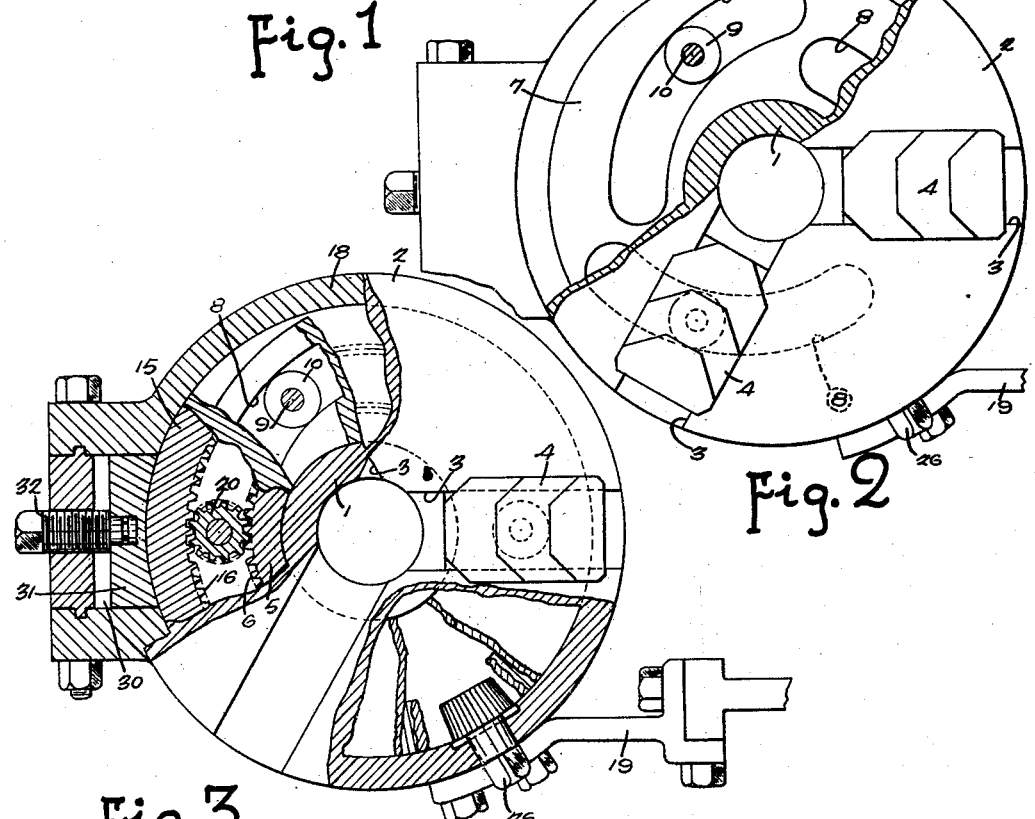
William N. Stevens
Inventor
by Smith and Freeman
Attorneys Dec. 29, 1931. W. N. STEVENS 1,838,714
CHUCK
Filed Jan. 4, 1927 2 Sheets-Sheet 2
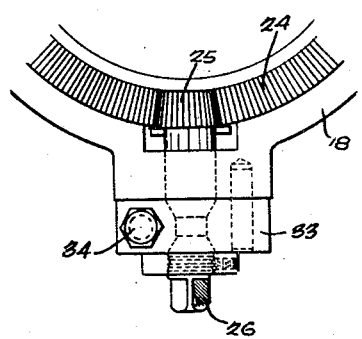
Fig.4
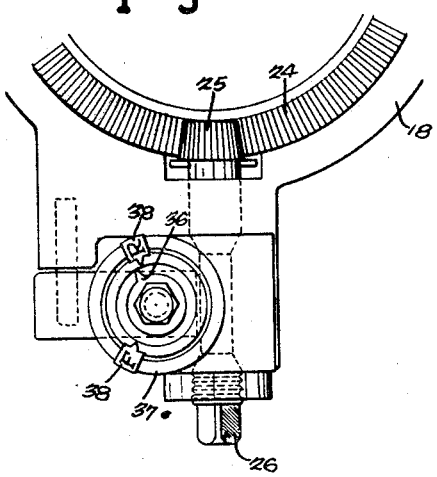
Fig.6
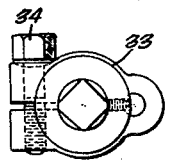
Fig.5
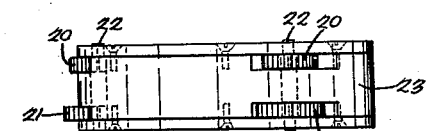
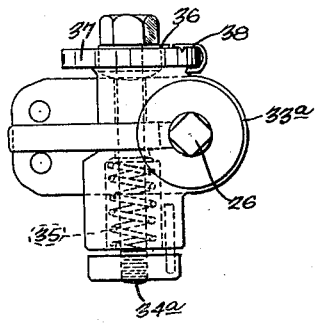
Fig.7
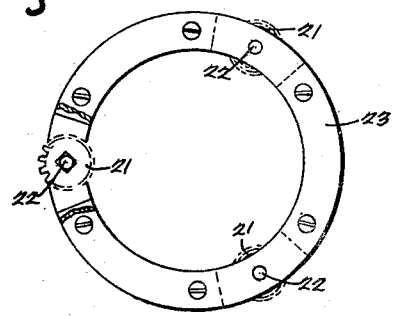
Fig.8
Fig.9
William N. Stevens
Inventor
by Smith and Freeman
Attorneys Patented Dec. 29, 1931

1,838,714

UNITED STATES PATENT OFFICE

WILLIAM N. STEVENS, OF LAKEWOOD, OHIO

CHUCK

Application filed January 4, 1927. Serial No. 158,984.

This invention relates to chucks and has especial reference to chucks of the rotary type used on machine tools and adapted to be opened and closed without arresting their rotation. The objects of the invention are the provision of simple and convenient expedients whereby the chuck is rendered self-closing; the provision of simply constructed and easily regulated means whereby the force of its closing movement can be predetermined and modified by the operator; while further objects and advantages will become apparent as the description proceeds.

In the accompanying drawings I have illustrated a preferred physical embodiment of my inventive idea. Fig. 1 is an axial sectional view of a chuck containing my improvements; Fig. 2 is a front elevation of such chuck with parts broken away; Fig. 3 is a front elevation of such chuck with other parts broken away; Fig. 4 is a detail view of a part of the manual releasing mechanism showing a modified form of automatic closing mechanism; Fig. 5 is an end elevation of the parts shown in Fig. 4; Fig. 6 illustrates a modified construction of the parts shown in Fig. 4; Fig. 7 is an end elevation of the parts shown in Fig. 6; and Figs. 8 and 9 are respectively an edge view and a face view of the floating cage and the planetary pinions carried thereby.

My improved chuck comprises the usual central cylindrical tube 1, having at its forward end a flat circular plate 2 formed with radial slideways 3 in which are mounted the jaws 4. Rotatably surrounding the tube 1 is a sleeve 5 formed with gear teeth 6 and having at its forward end an integral flange 7 formed with spiral grooves 8 equal in number to the jaws and receiving the rollers 9 mounted on studs 10 carried by the respective jaws whereby the latter are moved radially along their slideways. Tightly secured to the tube 1 at the opposite end of the sleeve 5 is a sleeve 12 having external gear teeth 13. Rotatably surrounding the gear 6 is a ring 15 having internal teeth 16 spaced from the teeth 6 but in the same plane; and non-rotatably surrounding the gear 13 is a second internal gear 17, supported by and keyed to a fixed cylindrical shell 18 which forms the body of the chuck and is prevented from rotating by being fastened in some way to the frame (not shown) of the machine with which it is used. An arm or bracket 19 is here illustrated for this purpose.

Interposed between the external gear 6 and internal gear 16 are one or more planetary gears 20 meshing with both of the same, and interposed between and meshing with the external gear 13 and internal gear 17 are other planetary gears 21. The gears 20 and 21 are coaxial and are carried by the short shafts 22 journaled in the cage 23 which floats in the space between the gears, as to move together around the axis of the chuck, as said cage revolves. The gears 20 and 21 have two sorts of movement, namely: an orbital movement around the axis of the sleeve 1, and a movement of rotation, each about its own axis. It is further obvious that when the gears 12 and 17 are rigidly connected to their associated members there must be a small relative difference in the speed of rotation of any gear 21 as compared with its companion gear 20, although their orbital speed is the same. The gears 5 and 12 are sometimes known as sun gears to distinguish them from the planet gears 20 and 21 which rotate about the same.

According to my invention the gears 20 and 21 are made of unequal size, the diameters of 6, 16, 13, and 17 being suitably adjusted to keep the gears 20 and 21 coaxial. As a result the rotation of the tube 1 causes the gears 21 and cage 23 to progress around the gear 17 which movement also causes a relative movement between the gears 6 and 16; but owing to the inequality of size between 20 and 21, the sleeve 5 does not rotate at the same speed as the tube so that the lag (or lead as the case may be) tends to produce a radial camming of the rollers 9. The direction of slope of the recesses 8 is so chosen as, combined with the ratio between the pinions 20 and 21, will force the chuck-jaws inward when the rotation of the ring 15 is arrested or impeded.

In order to provide for manual opening of the chuck-jaws the ring 15 is provided with another set of teeth 24 meshing with a pinion 25 having a prismatic shank 26 adapted to receive a suitable key (not shown). The rotation of the ring 15 is impeded by a suitable friction device, and the force exerted on the chuck-jaws varies directly with this friction as will be obvious. This friction may be provided in numerous ways. According to one arrangement, the shell 18 is formed with a recess 30 receiving a brake shoe 31 suitably controlled as by a radial screw 32. According to another arrangement the shank of the pinion 25 (which is generally made a bevel pinion so that this shank is radial although this is not essential to the invention) is provided with a braking device such as the split collar 33 shown in Figs. 4 and 5 and constricted by the tangent screw 34.

In order to gauge the degree of braking and hence the pressure on the chuck-jaws the operator naturally takes account of the angular motion of the screw 32 or 34 or the amount of resistance to the rotation thereof. This can also be made visible if desired, as for example, by the modification shown in Figs. 6 and 7 wherein the clamp 33ª is closed by a tangent screw 34ª acting through a spring 35, the head of the screw having a pointer 36 cooperating with suitable graduations on a dial 37, the graduations here consisting of movable clips 38 having the letters "R" for "roughing" and "F" for "finishing" thereon.

In order to cut entirely through the scale which a casting or forging usually exhibits, as well as to expedite the work, it is customary to make the first cuts very deep, and this requires a correspondingly powerful setting of the chuck jaws; also the continuous pressure exerted on the chuck jaws by reason of the continuous drag on the ring 15 keeps said jaws constantly bearing against the work at the predetermined pressure and overcomes any tendency of the same to work loose. This tight setting, however, frequently if not invariably deforms the work, so that before taking the finishing cut the pressure of the jaws should be relieved to some extent, although not sufficiently to release the work. The work is introduced into the chuck and the braking action applied which causes the chuck jaws to move inwardly until the reaction causes the brake to slip which then continues so long as the chuck revolves. For the first or roughing cut the brake is applied strongly after which the brake is partly released whereupon the vibration coupled with the slant of the recesses 8 and the reaction of the jaws usually causes the ring 15 to advance until the reaction corresponds to this new degree of friction. In some kinds of work this releasing action should be assisted by the operator. Turning the ring 15 by the shank 26 causes the release of the jaws, and all these actions occur without interference from the rotation of the chuck.

The rear of the device is closed by an end plate 40 which may either stand still with the shell 18 or rotate with the tube 1, although I have here shown it as bolted to the shell. It will be understoood that many changes in details can be made.

Having thus described my invention what I claim is:

1. In a chuck a rotatable part having jaw-guides, jaws radially movable in said guides, an annular member rotatable relative to said first member and having spiral cam portions interfitting with said jaws, said annular member also having gear teeth, a second annular member rotatable relative to said first member and also having gear teeth concentric to the same axis as said first gear teeth but unequal in pitch-diameter, a non-rotatable member surrounding both said annular members, two internal gears, one surrounding each set of gear teeth hereinbefore identified, one of said internal gears being fixedly mounted relatively to said non-rotatable member, means carried by said non-rotatable member for frictionally retarding the rotation of said second internal gear, and planetary pinions connecting each of said internal gears to the corresponding toothed members, the pinions of said respective planetary systems being connected together in pairs so as to move with equal speed around the chuck axis.

2. In a differential chuck, a rotatable part, clamping jaws carried thereby, a fixed part, two planetary gear systems coaxial with each other and with said rotatable part, each of said systems comprising a sun gear, a series of planet gears rotatable therearound, and an internal gear surrounding each set of planet gears, said systems having a ratio other than one to one, means compelling planet gears of the two systems to rotate together about the chuck axis, means positively securing the sun gear of one system and the internal gear of the other system, one to the said rotatable part and the other to the said fixed part, means frictionally retarding the progressive tendency of one of said planetary systems created by the difference in ratio between it and the other system, and means for transforming said progressive tendency into clamping pressure upon said jaws.

3. In a chuck a rotatable part having jaw-guides, jaws radially movable in said guides, an annular member rotatable relative to said first member and having spiral cam portions interfitting with said jaws, said annular member also having gear teeth, a second annular member rotatable relative to said first member and also having gear teeth concentric to the same axis as said first gear teeth but unequal in pitch-diameter, a non-rotatable member surrounding both said annular members, two internal gears, one surrounding each set of gear teeth hereinbefore identified, one of said internal gears being fixedly mounted relatively to said non-rotatable member, means carried by said non-rotatable member for frictionally retarding the rotation of said second internal gear, and planetary pinions connecting each of said internal gears to the corresponding toothed members, the pinions of said respective planetary systems being connected together in pairs so as to move together about the chuck axis, gear teeth carried by said second internal gear, and a manually operable pinion carried by said non-rotatable member and meshing with said second internal gear.

4. In a differential chuck, in combination, a rotatable part having jaw-guides, jaws radially movable in said guides, two planetary gear systems carried by said chuck, each system comprising a sun gear, planet gears, and an internal gear the planet-gears of said two systems being of unequal size and connected together in pairs, one of the sun gears being rotatable with the chuck, the other of said sun gears having camming portions cooperating with said jaws, one of the internal gears being fixed, and means for applying a regulable braking action to the other internal gear.

5. In a differential chuck, in combination, a rotatable part having jaw-guides, jaws radially movable in said guides, two planetary gear systems carried by said chuck, each of said systems comprising a sun gear, planet gears, and an internal gear, the planet-gears of said two systems being of unequal size and connected together in pairs, one of the sun gears being rotatable with the chuck, the other of said sun gears having camming portions cooperating with said jaws, one of the internal gears being fixed, and means for applying both an impositive braking action and a positive anticipating movement to the other of said internal gears.

6. In a differential chuck of the type comprising two coaxial planetary gear systems, each system comprising a sun gear, planet gears, and an internal gear which surrounds and meshes with said planet gears the planet gears of the two systems being secured together in pairs so as to revolve together about the chuck axis, the improvement which consists in making the planet gears of the two systems of unequal size and providing a brake to oppose the drifting action thereby produced on one of said systems.

7. In a chuck, a rotatable part having jaw-guides, jaws radially movable in said guides, an annular member rotatable relative to said first member and having spiral cam portions interfitting with said jaws, said annular member also having gear-teeth, a second annular member coaxial with said first member and also having outwardly facing gear-teeth unequal in number to said first gear-teeth, a non-rotatable member surrounding both said annular members, two internal gears, one surrounding each set of gear-teeth hereinbefore identified, planetary pinions connecting each of said internal gears to the teeth of the corresponding annular member, the pinions of said respective planetary systems being connected together so as to revolve at equal speeds about the chuck axis, means for retarding the rotation of at least one of said internal gears, while also enabling the rotation of at least one of said internal gears against friction; additional gear-teeth carried by one of said internal gears, and a manually operable pinion carried by said non-rotatable member and meshing with said last named gear-teeth whereby independent movement can be imparted to said internal gear.

8. In a chuck, a rotatable part having jaw guides, jaws radially movable in said guides, an annular member rotatable relative to said first member and having spiral cam-portions interfitting with said jaws, said annular member also having gear-teeth, three additional annular members coaxial with said first annular member and also having gear-teeth concentric to the same axis as said first gear-teeth, two of said three last named annular members constituting respectively the internal and external gears of a planetary system, and the third of said annular members cooperating with said first annular member to form the internal and external gears of a second planetary system, the internal gears of said two planetary systems being unequal in pitched diameter, sun-gears located between and meshing with the internal and external gears, a fourth annular member located between said respective sun and planet systems, and having said sun-gears rotatably mounted at opposite sides thereof; in combination with means for applying frictional retarding force to at least one of said four last named rotatable members, and means including an operable pinion and auxiliary gear teeth meshing therewith for imparting an additional rotational movement to one of said annular members other than the first and fifth.

In testimony whereof I hereunto affix my signature.

WILLIAM N. STEVENS.